(12) United States Patent
Butterworth et al.

(10) Patent No.: US 6,941,420 B2
(45) Date of Patent: Sep. 6, 2005

(54) LOG-STRUCTURE ARRAY

(75) Inventors: Henry Esmond Butterworth, Chandlers Ford (GB); Robert Bruce Nicholson, Portsmouth (GB); William James Scales, Fareham (GB); Douglas Turner, Bristol (GB)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 10/080,488

(22) Filed: Feb. 22, 2002

(65) Prior Publication Data

US 2002/0118582 A1 Aug. 29, 2002

(30) Foreign Application Priority Data

Feb. 23, 2001  (GB) .............................................. 0104469

(51) Int. Cl.[7] .............................................. G06F 12/00
(52) U.S. Cl. ........................ 711/114; 711/165; 711/202
(58) Field of Search ................................ 711/114, 165, 711/202

(56) References Cited

U.S. PATENT DOCUMENTS

| | | | |
|---|---|---|---|
| 5,124,987 A | | 6/1992 | Milligan et al. ................ 714/7 |
| 5,502,836 A | * | 3/1996 | Hale et al. .................... 711/170 |
| 5,671,390 A | | 9/1997 | Brady et al. .................. 711/113 |
| 5,758,118 A | * | 5/1998 | Choy et al. ................... 711/114 |
| 6,058,489 A | * | 5/2000 | Schultz et al. .................. 714/7 |

OTHER PUBLICATIONS

Jai Menon, "A Performance Comparison of RAID–5 and Log–Structured Arrays", RJ–9927 (87886) Jan. 3, 1995; Computer Science, 95A000367 p. 1–34.

* cited by examiner

*Primary Examiner*—Reginald G. Bragdon
(74) *Attorney, Agent, or Firm*—Kunzler & Associates

(57) ABSTRACT

A log structured array (LSA) controller apparatus controls the transfer of information between a processor and a plurality of information storage devices configured as an N+1 array in which the information is stored as stripes extending across the devices of the array, each stripe comprising N information strips and one parity strip, each information strip storing an integer number of logical tracks. The controller defines an LSA directory that specifies the location of each logical track in terms of the ID of the stripe to which the track belongs and the offset of the track within the stripe; wherein on the addition of an information storage device to the array, the additional strip provided for each stripe by the storage device is logically appended to the end of each stripe in the LSA directory.

22 Claims, 2 Drawing Sheets

| | Disk 0 | Disk 1 | Disk 2 | Disk 3 | Disk 4 |
|---|---|---|---|---|---|
| Stripe 0 | D0 | D1 | D2 | P0 | 0 |
| Stripe 1 | D3 | D4 | P1 | D5 | 0 |
| Stripe 2 | D6 | P2 | D7 | D8 | 0 |
| Stripe 3 | P3 | D9 | D10 | D11 | 0 |
| Stripe 4 | D12 | D13 | D14 | P4 | 0 |
| Stripe 5 | D15 | D16 | P5 | D17 | 0 |

|         | Disk 0 | Disk 1 | Disk 2 | Disk 3 |
|---------|--------|--------|--------|--------|
| Stripe 0 | D0 | D1 | D2 | P0 |
| Stripe 1 | D3 | D4 | P1 | D5 |
| Stripe 2 | D6 | P2 | D7 | D8 |
| Stripe 3 | P3 | D9 | D10 | D11 |
| Stripe 4 | D12 | D13 | D14 | P4 |
| Stripe 5 | D15 | D16 | P5 | D17 |

FIG. 2

|         | Disk 0 | Disk 1 | Disk 2 | Disk 3 | Disk 4 |
|---------|--------|--------|--------|--------|--------|
| Stripe 0 | D0 | D1 | D2 | P0 | 0 |
| Stripe 1 | D3 | D4 | P1 | D5 | 0 |
| Stripe 2 | D6 | P2 | D7 | D8 | 0 |
| Stripe 3 | P3 | D9 | D10 | D11 | 0 |
| Stripe 4 | D12 | D13 | D14 | P4 | 0 |
| Stripe 5 | D15 | D16 | P5 | D17 | 0 |

FIG. 3

|         | Disk 0 | Disk 1 | Disk 2 | Disk 3 | Disk 4 |
|---------|--------|--------|--------|--------|--------|
| Stripe 0 | D0 | D1 | D2 |  | P0 |
| Stripe 1 | D3 | D4 | D5 | P1 | 0 |
| Stripe 2 | D6 | D7 | P2 | D8 | 0 |
| Stripe 3 | D9 | P3 | D10 | D11 | 0 |
| Stripe 4 | P4 | D12 | D13 | D14 | 0 |
| Stripe 5 | D15 | D16 | D17 | 0 | P5 |

FIG. 4

LOG-STRUCTURE ARRAY

FIELD OF THE INVENTION

The present invention relates generally to a method and system of adding storage devices to a log-structured array storage system.

BACKGROUND OF THE INVENTION

Many current mid to high-end data processing systems employ storage systems that comprise arrays of small form factor direct access storage devices such as magnetic disk drives. Such arrays are designed to emulate large form factor devices while offering the advantages of lower cost, smaller size, improved performance and reduced power consumption. A number of alternative array architectures have been developed to achieve good overall array reliability; one of which is RAID (Redundant Array of Independent Disks) defined by the RAID advisory board and which includes a number of variants (commonly called 'levels'). One commonly used variant is RAID 5 in which a data stripe consists of a number of data strips and a parity strip, each strip being stored on one member disk of the array. In RAID 5 the parity strips of different data stripes are distributed across the member disks. Further details of RAID 5 and the other variants may be found in the 'RAID book' (ISBN 1-57398-028-5).

A more recently developed array architecture is the Log Structured Array (LSA) in which the Log Structured Filesystem (LSF) approach, pioneered at the University of California Berkeley, is combined with RAID. Examples of systems employing the LSA architecture are described in U.S. Pat. Nos. 5,124,987 and 5,671,390. LSA is most often described as being implemented using RAID 5 techniques.

An LSA consists of a disk controller and N+1 physical disks. In an LSA, data is stored on disks in compressed form. After a piece of data is updated, it may not compress to the same size as it did before it was updated, so it may not fit back into the space that had been allocated for it before the update. The implication is that there can no longer be fixed, static locations for all the data. An LSA controller manages information storage to write updated data into new disk locations rather than writing new data in place. Therefore, the LSA must keep a directory which it uses to locate data items in the array.

As an illustration of the N+1 physical disks, an LSA can be considered as consisting of a group of disk drive DASDs, each of which includes multiple disk platters stacked into a column. Each disk is divided into large consecutive areas called segment-columns. A segment-column is typically as large as a physical cylinder on a physical disk. Corresponding segment-columns from the N+1 disks constitute a segment. The array has as many segments as there are segment-columns on a disk in the array. One of the segment-columns of a segment contains the parity (exclusive-OR) of the remaining segment-columns of the segment. For performance reasons, the parity segment-columns are not all on the same disk, but are rotated among the disks.

Logical devices are mapped and stored in the LSA. A logical track is stored, as a set of compressed records, entirely within some segment of the LSA; many logical tracks can be stored in the same segment. The location of a logical track in an LSA changes over time. A directory, called the LSA directory, indicates the current location of each logical track. The LSA directory is maintained either in Non-Volatile Storage (NVS) or paged virtual memory in the disk controller.

Reading and writing into an LSA occurs under management of the LSA controller. An LSA controller can include resident microcode that emulates logical devices such as direct access storage device (DASD) disk drives, or tape drives. In this way, the physical nature of the external storage subsystem can be transparent to the operating system and to the applications executing on the computer processor accessing the LSA. Thus, read and write commands sent by the computer processor to the external information storage system would be interpreted by the LSA controller and mapped to the appropriate disk storage locations in a manner not known to the computer processor. This comprises a mapping of the LSA logical devices onto the actual disks of the LSA.

A write received from the host system is first written into a non-volatile cache and the host is immediately notified that the write is done. The fraction of cache occupied by modified logical tracks is monitored by the controller. When this fraction exceeds some threshold, some number of modified logical tracks are moved (logically) to a memory segment, from where they get written (destaged) to disk. The memory segment is a section of controller memory, logically organized as N+1 segment-columns called memory segment-columns; N data memory segment-columns and 1 parity memory segment-column. When all or part of a logical track is selected from the NVS, the entire logical track is written into one of the N data memory segment-columns. When all data memory segment-columns are full, an XOR operation is applied to all the data memory segment-columns to create the parity memory segment-column, then all N+1 memory segment-columns are written to an empty segment on the disk array. It is important for the performance of LSA that a segment is an integral number of RAID 5 stripes so that parity can be calculated over the destaged data without reading the old data and parity and so incurring the RAID 5 write penalty.

All logical tracks that were just written to disk from the memory segment must have their entries in the LSA directory updated to reflect their new disk locations. If these logical tracks had been written before by the system, the LSA directory would have contained their previous physical disk locations; otherwise the LSA directory would have indicated that the logical track had never been written, and consequently has no address. Note that writing to the disk is more efficient in LSA than in RAID-5, where 4 disk accesses are needed for an update.

In Log Structured Arrays, data to be written is grouped together into relatively large blocks (the segments) which are written out as a unit in a convenient free segment location on disk. When data is written, the previous disk locations of the data become free creating "holes" of unused data (or garbage) in the segments on disk. Eventually the disk fills up with segments and it is necessary to create free segment locations by reading source segments with holes and compacting their still-in-use content into a lesser number of destination segments without holes. This process is called free space or garbage collection.

When the user of a non-LSA RAID array wishes to expand the storage capacity of the array, one option is to add one or more new member disk drives to the array. In RAID 5 arrays, the problem arises as to how to remap the data and/or parity whilst adding one or more disks. Furthermore a number of characteristics are important for any RAID array expansion scheme: (i) host IOs should not be held off for long periods of time; (ii) the amount of data/parity that needs to be moved should be minimised; and (iii) the translation of logical address to physical address should be kept as simple as possible since this calculation must be performed for every array IO access. A number of patents including U.S. Pat. Nos. 5,502,836, 5,524,204, 5,615,352 and 5,758,118 address the aforementioned problem and seek to trade off these desirable characteristics.

Expansion capability for log structured arrays is also desirable. One relatively straight forward way of doing this would be to add a complete new RAID array to the log-structured array, as a log structured array may consist of one or more RAID arrays. However, the LSA user may not need all the additional storage capacity provided by an additional RAID array and therefore it would often be preferable to increase storage capacity by adding one or more member disk drives to a RAID array which is already a member of an LSA. However, a number of additional problems arise in adding new members to a RAID array that forms part is of an LSA, none of which are addressed in the prior art. These are: (i) LSA performance is tied to the ability to perform full stripe writes for destaging segment sized IOs to the array. Thus the logical block addresses of the blocks in a stripe after the array expansion must be sequential; (ii) since the LSA segment size is tied to the array stripe size, if this changes, the segment size for new destages must change to match; and (iii) since LSA obtains new segments for filling by employing a garbage collection algorithm over previously destaged segments, it is convenient that newly destaged segments are the same size as pre-existing segments.

It would be desirable to provide an improved expansion/contraction scheme for an information storage system configured as a log structured array.

SUMMARY OF THE INVENTION

According to a first aspect of the invention there is provided a log structured array (LSA) controller apparatus for controlling the transfer of information between a processor and a plurality of information storage devices configured as an N+1 array in which the information is stored as stripes extending across the devices of the array, each stripe comprising N information strips and one parity strip, each information strip storing an integer number of logical tracks; the controller further defining an LSA directory which specifies the location of each logical track in terms of the ID of the stripe to which the logical track belongs and the offset of the logical track within the stripe; wherein on the addition of an information storage device to the array, the additional strip provided for each stripe by the storage device is logically appended to the end of each stripe in the LSA directory.

According to second aspect of the invention there is provided a method of adding an information storage device to a plurality of information storage devices in an information processing system in which a processor is connected for communication with the information storage devices by means of a log structured array controller, the plurality of information storage devices being configured as an N+1 array in which the information is stored as stripes extending across the devices of the array, each stripe comprising N information strips and one parity strip, each information strip storing an integer number of logical tracks, the controller further defining an LSA directory which specifies the location of each logical track in terms of the ID of the stripe to which the logical track belongs and the offset of the logical track within the stripe, the method comprising connecting the additional information storage device to the log-structured array controller and logically appending the additional strip, provided to each existing stripe by the additional storage device, to the end of each stripe in the LSA directory.

The present invention is thus predicated on the LSA directory defining the location of a logical track within the array using the construct {stripe number, offset} rather than the traditional construct {logical block address}. In this way, the additional strip provided by the additional storage device for each existing stripe is logically appended to the end of the existing stripes and the addresses previously stored in the LSA are still correct.

In a preferred embodiment, for array configurations where prior to the addition of the additional storage device the parity strips are rotated amongst the N+1 information storage devices in accordance with the RAID-5 architecture, the method further comprises moving selected parity strips to the additional information storage device at locations that would have stored parity strips had the array originally comprised N+2 information storage devices. In this way skew in the load on the storage devices is avoided.

A preferred embodiment of the present invention will now be described, by way of example only, with reference to the accompanying drawings.

BRIEF DESCRIPTION OF THE DRAWINGS

FIG. 2 is a tabular representation of an array of 3+P disk storage devices prior to the addition of the extra disk storage device;

FIG. 3 is a tabular representation of an expanded array prior to transfer of information to the extra disk storage device; and FIG. 4 is a tabular representation of an expanded array in which parity strips have been moved to the additional disk storage device in accordance with one embodiment of the present invention.

DETAILED DESCRIPTION OF THE PREFERRED EMBODIMENT

Figure 1:
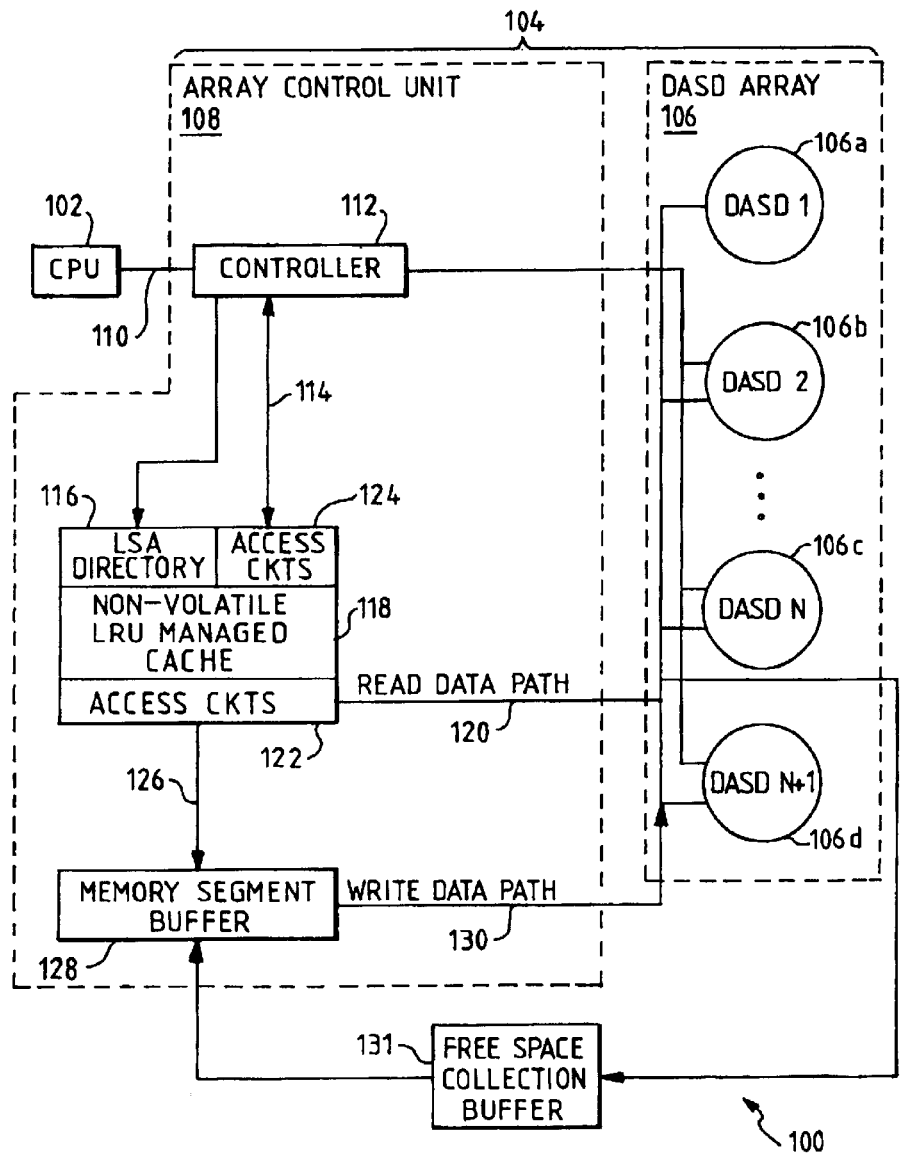
FIG. 1 is a representation of a computer system constructed in accordance with an embodiment of the present invention.

FIG. 1 shows a preferred embodiment of a computer system 100 constructed in accordance with the present invention. The system 100 includes a processor 102 or host computer that communicates with an external information storage system 104 having N+1 direct access storage devices (DASD) in the form of disks in which information is maintained as a log structured array (LSA). In accordance with the RAID 5 architecture, each disk is logically divided into large consecutive areas called segment-columns where a segment-column is typically as large as a physical cylinder on a physical disk. Corresponding segment-columns from the N+1 disks constitute a segment. The array has as many segments as there are segment-columns on a disk in the array. One of the segment-columns of a segment contains the parity (exclusive-OR) of the remaining segment-columns of the segment. For performance reasons, the parity segment-columns are not all on the same disk, but are rotated among the disks.

In FIG. 1, an array 106 comprising four disks 106a, 106b, 106c, and 106d is shown for illustration, but it should be understood that the array may include a greater or lesser number of disks. A control unit 108 controls the storage of information so that the array 106 is maintained as an LSA. Thus, the DASD recording area is divided into multiple segment-column areas and all like segment-columns from all the disks comprise one segment's worth of data. The control unit 108 manages the transfer of data to and from the array 106 so that periodically it considers segments for free space and selects target segments according to a fitness function described in detail below.

The processor 102 includes (not illustrated): one or more central processor units, such as a microprocessor, to execute programming instructions; random access memory (RAM) to contain application program instructions, system program instructions, and data; and an input/output controller to respond to read and write requests from executing applications. The processor 102 may be coupled to local DASD (not illustrated) in addition to being coupled to the LSA 104. Typically, an application program executing in the processor 102 may generate a request to read or write data, which causes the operating system of the processor to issue a read or write request, respectively, to the LSA control unit 108.

When the processor 102 issues a read or write request, the request is sent from the processor to the control unit 108 over a data bus 110 and is received in the control unit by a controller 112. In response, the controller produces control signals and provides them over a controller data path 114 to an LSA directory 116 and thereby determines where in the LSA the data is located, either in a non-volatile LSA data cache 118 or in the DASD 106. The LSA controller 112 comprises one or more microprocessors with sufficient RAM to store programming instructions for interpreting read and write requests and for managing the LSA 104 in accordance with the present invention.

Data is transferred between the processor 102 and the LSA 104 during read operations over a path including a read data path 120, DASD access circuits 122, the LSA data cache 118, controller access circuits 124, the controller data path 114, the controller 112, and the data bus 110. Data is transferred during write operations over a path including the data bus 110, the controller 112, the controller data path 114, the controller access circuits 124, the LSA data cache 118, the DASD access circuits 122, a segment data path 126, an accumulating memory segment input write buffer 128, and a DASD write path 130.

The data cache 118 permits delay of write operations on modified data logical tracks to the memory segment 128 for purposes of maintaining seek affinity. More particularly, if write operations to adjacent logical tracks are received, then all modified data in logically adjacent tracks will be moved into the memory segment 128 at the same time so they are stored in the same segment-column. This helps keep together logical tracks that are adjacent in the data cache so they will be adjacent when moved into the DASD array 106, thereby preserving seek affinity. The advantages and operation of the data cache 118 are described in greater detail in U.S. Pat. No. 5,551,003 issued Aug. 27, 1996 and assigned to International Business Machines Corporation.

Preferably, the LSA data cache 118 is managed as a least-recently-used (LRU) cache, so that data is queued in the cache, with the most recently stored data at the top or (front) of the queue. In particular, the LSA data cache 118 is organized with clean data tracks in one LRU list and dirty tracks in another LRU list. The clean LRU list specifies logical tracks containing information wherein the data in the LSA cache is the same as the data in the DASD array, and the dirty LRU list specifies logical tracks containing modified data wherein data is different from the data in the DASD array.

A basic operation of the storage system 104 is to write a particular logical track so as to change the contents of the logical track. In general, such live data tracks are first placed in the non-volatile data cache memory 118 of the LSA control unit 108. When the fraction of the cache occupied by modified logical tracks exceeds a predetermined value, the controller 112 logically moves a set number of modified tracks to the memory segment 128 by assigning them there. After one segment's worth of live tracks are moved into the memory segment, the tracks are written into contiguous locations of the DASD array 106. It should be understood that the operation of the data cache 118 is transparent to the processor 102 and therefore some operations of the storage system 104 will be described from the perspective of the processor, without reference to the data cache. Although the inclusion of a data cache 118 as described above can improve the overall performance of an LSA system, it should be understood that the inclusion of a data cache and the details of its implementation are not essential to the invention.

The smallest unit of data that can be addressed by the LSA directory 116 is called a logical track. If the processor 102 writes data comprising part of a track, the LSA control unit 108 must read the remainder of the logical track from the DASD array 106 making reference to the current location of the logical track stored in the LSA directory 116 before writing the updated complete track into the memory segment buffer 128. A variable number of compressed logical tracks comprise a segment (depending upon how well the logical tracks compress). At any time, a logical track is live, or current, in only one segment. In all other segments, the logical track is outdated, also referred to as being a dead track. From the perspective of the processor 102, a live data track is initially stored into controller memory (such as the data cache 118 or the input memory segment write buffer 128) comprising a segment $SEG_o$ that initially is empty. That is, the segment $SEG_o$ resides in the controller memory as the segment is filled.

If a logical track k is being written into the segment $SEG_o$ of controller memory and if the logical track k was previously live in some other DASD segment SEG in the DASD 106 before the write operation, then the track k becomes dead in the segment SEG and becomes live in the controller segment $SEG_o$ being filled. This continues until the segment $SEG_o$ in the LSA controller memory is filled to capacity, at which time the segment $SEG_o$ is destaged, i.e. it is moved from the memory segment buffer 128 and written to the DASD array 106. Another segment's worth of data is then filled in the controller memory and the process repeats until the next destage operation. In practice for performance reasons this logic may be duplicated resulting in multiple memory segment buffers 128 being filled concurrently. This concurrency does not change the basic principle of operation.

As discussed above, it may become desirable to increase the overall storage capacity of the LSA. The present invention provides a technique whereby one or more DASDs can be added to the array. In the following description there will be detailed the process for adding a single additional DASD to an existing array. However the techniques are applicable to the task of adding more than one new disk at a time.

In the present invention, the LSA directory describes the location of a track within a specific RAID array by using the construct {stripe number, offset} rather than simply {logical block address}. To use the technique and system of the present invention, it is required to employ an arrangement wherein a LSA segment maps to exactly one RAID stripe. Thus, a RAID strip and an LSA Segment column are the same thing and the block offset into a segment is the same as the block offset into the RAID stripe. It can be shown that this is the optimal arrangement for LSA in any case. These two predicates allow for the size of a segment to increase and potentially decrease (see the following discussion) without affecting the contents of the existing LSA directory.

With reference now to FIG. 2 there is shown in tabular form a 3+P RAID 5 array with a strip size of S logical blocks in which the data strips are numbered D0 D1 D2 etc. and the parity strips are numbered P0 P1 P2 etc. In this arrangement, each data strip starts at an array LBA given by its strip number (D0, D1 etc.) multiplied by S. Thus data strip D2 starts at LBA 2*S.

It will be noted in passing that many RAID 5 implementations rotate the first strip in a stripe around the disks in the same way that that the parity rotates. This is usually done to improve the performance of sequential reads. Since sequential reads at the disk level are rare in LSA, this feature is not as attractive. The arrangement shown above was chosen for LSA in the present invention because it reduces the number of data/parity moves when a disk is added.

In the current invention, the procedure for adding a disk to the RAID array is as follows:

1. The new disk is initialised to all binary 00s so that it can be included in the parity calculations without modifying the parity already on disk.

2. Accesses to the RAID array are temporarily suspended and any data cached by RAID 5 array location is flushed from the cache.

3. The new disk (disk 4) is added as a member of the RAID array. The arrangement at this point in the process is as shown in FIG. 3.

4. There are now several algorithms that can be applied to optionally relocate the parity and/or the data.

In the preferred embodiment, the data and parity are migrated from the arrangement of FIG. 2 to the arrangement of FIG. 4 such that the data and parity are move to the position that they would have occupied had the array originally been created with 4 disks. In the preferred embodiment this migration happens gradually, alongside and as part of the normal IO workload of the disks with little impact. The algorithm for this task is as follows:

A bitmap is initialised which has a single bit to represent each stripe in the array. The bit value indicates whether the data and parity in the strip are in the position shown in FIG. 2 or the position shown in FIG. 4.

At this point, IO accesses to the array can be enabled. The algorithm for servicing them is as follows:

Reads/Cache stages: If the strip being accessed is one for which the position of the data is different in FIG. 4 from the position in FIG. 2 then the bitmap is examined in order to determine which disk to access.

Destage operations are much simpler since these always occur as full strife writes. In this case the data and parity are written as the position shown in FIG. 4 and the bitmap is updated if necessary to show that the data and parity have been removed.

In an alternative arrangement, a background process is set up to migrate the data and parity from FIG. 2 format to FIG. 4 format. This is not preferred since it is much easier to migrate the data and parity between the formats during a full stripe write (no locking or reading needs to be performed) and because the skewing of the load on the disk has only very slight impact for the read only workload which is applied to the disks between segment destages in LSA.

If the data and parity is relocated by a background process then it should be noted that the amount of parity and data which need to be moved is much less than (approximately half) that which has to be moved in schemes of the prior art which maintain optimal parity rotation and keep full strips sequential on disk. For example, in stripe 0 no movement at all needs to take place since the position of the data strips has not changed and we pre-initialised disk 4 with zeros so it can be used as the parity. In stripe 1 only P1 and D5 need to be swapped, leaving D3 and D4 where they were.

The benefit of moving the parity to the FIG. 4 format is that the optimal rotation of parity on the disks is maintained. This is traded off against the cost of relocating the parity.

In an alternative embodiment the parity is not moved, rather it is maintained in the format shown in FIG. 2. The benefit of this approach is that no parity movement must take place but this is at the cost of slightly skewing the load on the disks. A second alternative would be to swap the location of a parity strip and a single data strip on each stripe to achieve the optimal rotation of parity on the disks, but without keeping a sequential ordering of data strips across the disks. This would further reduce the amount of parity and data which need to be moved but would make the calculation to determine the location of data strips more complex.

5. After adding the new drive to the array, each stripe now has an unused strip which is located logically as the last strip in the stripe.

The appending of an extra strip onto the end of each stripe would not be viable if the addresses in the LSA directory were based upon logical block address. The addition of an extra strip into each stripe has changed the logical block address of every block of data after the first stripe in the array. Since in accordance with the preferred embodiment, the address stored in the LSA directory is of the form stripe {number,offset} and the new strip is logically appended at the end of the existing stripes, the addresses stored in the LSA directory are still correct.

All that has happened therefore is that each pre-existing segment has been expanded by the addition of some unused space at the end of the segment. This newly added space will become available for new destages as segments are garbage collected during the normal operation of the LSA.

It is also possible to run this procedure in reverse to remove a disk from a RAID array—LSA garbage collection is used to shrink every segment on the RAID array such that it no longer occupies the last strip in the stripe. As each segment is written back to the array, the written in the format shown in FIG. 2.

What is claimed is:

1. A method of adding an information storage device to a plurality of information storage devices in an information processing system in which a processor is connected for communication with the information storage devices by means of a log structured array (LSA) controller in which information is stored as a plurality of stripes extending across the plurality of storage devices, the LSA controller further defining a directory which specifies storage locations using a construct comprising a stripe number and an offset, the method comprising connecting the additional information storage device to the LSA controller and logically appending an additional strip provided to each existing stripe by the additional storage device to the end of each stripe in the directory.

2. The method of claim 1, further comprising configuring the plurality of information storage devices as an N+1 array.

3. The method of claim 1, wherein each stripe comprises N information strips and one parity strip, each information strip storing an integer number of logical tracks.

4. The method of claim 1, wherein the directory comprises a LSA directory which specifies the location of a logical track in terms of the ID of the stripe to which the track belongs and the offset of the track within the stripe.

5. The method of claim 1, wherein prior to the addition of the additional storage device, the parity strips are rotated amongst the N+1 information storage devices in accordance with a RAID-5 architecture, the method further comprising moving selected parity strips to the additional information storage device at locations that would have stored parity strips had the array originally comprised N+2 information storage devices.

6. The method of claim 5, wherein the data and parity strips are moved to the additional storage device during normal IO operations to the devices.

7. The method of claim 6, wherein a bitmap is defined by the controller, each bit of the bitmap representing an array stripe and indicating whether the data and parity strips of the stripe arc located in their original position or in the position appropriate to the plurality of information storage devices including the additional information storage device.

8. The method of claim 5, wherein a background task is defined by the controller to move the data and parity strips to the additional storage device.

9. The method of claim 1, wherein the additional information storage device is initialised to all binary zeros prior to connection to the controller.

10. The method of claim 1, further comprising connecting a plurality of additional information storage devices to the log-structured array controller and logically appending the additional strips, provided to each existing stripe by the additional storage devices, to the end of each stripe in the LSA directory.

11. The method of claim 1, wherein connecting the additional information storage device to the LISA controller further comprises:
   initializing the new disk to all binary zeroes so that the new disk can be included in the parity calculations without modifying the parity already on disk;
   temporarily suspending accesses to a RAID 5 array controlled by the LSA controller and flushing any data cached by the RAID array;
   adding the new disk as a member of the RAID array; and
   applying an algorithm to optionally relocate the parity and/or the data.

12. A log structured array (LSA) controller comprising a logic device configured to control the transfer of information between a processor and a plurality of information storage devices in which the information is stored as a plurality of strips extending across the plurality of storage devices, and further configured upon the addition of a new information storage device to the array, to logically append to the end of each stripe in a directory a new strip provided for the new information storage device, the directory specifying storage locations using a construct comprising a stripe number and an offset.

13. The LSA controller of claim 12, wherein the plurality of information storage devices are configured as an N+1 array.

14. The LSA controller of claim 12, wherein each stripe comprises N information strips and one parity strip, each information strip storing an integer number of logical tracks.

15. The LSA controller of claim 12, wherein the directory further comprises an LSA directory specifying the location of a logical track in terms of the ID of the stripe to which the track belongs and the offset of the track within the stripe.

16. A log structured array (LSA) controller for adding an information storage device to a plurality of information storage devices in an information processing system in which a processor is connected for communication with the information storage devices by means of a log structured array (LSA) controller in which the information is stored as a plurality of stripes extending across the plurality of storage devices, the LSA controller comprising:
   a directory which specifies storage locations using a construct comprising a stripe number and an offset;
   means for connecting the additional information storage device to the LSA controller; and means for logically appending an additional strip provided to each existing stripe by the additional storage device to the end of each stripe in the directory.

17. The log structured array (LSA) controller of claim 16, further comprising means for configuring the plurality of information storage devices as an N+1 array.

18. The log structured array (LSA) controller of claim 16, wherein each stripe comprises N information strips and one parity strip, each information strip storing an integer number of logical tracks.

19. The log structured array (LSA) controller of claim 16, wherein the directory comprises a LSA directory which specifies the location of a logical track in terms of the ID of the stripe to which the track belongs and the offset of the track within the stripe.

20. An information storage system comprising:
   a plurality of information storage devices;
   a processor connected for communication with the information storage devices by means of a log structured array (LSA) controller in which the information is stored as a plurality of stripes extending across the plurality of storage devices,
   an LSA controller comprising a directory which specifies storage locations using a construct comprising a stripe number and an offset, the LSA controller configured to connect an additional information storage device to the LSA controller and logically append an additional strip provided to each existing stripe by the additional storage device to the end of each stripe in the directory.

21. The information storage system of claim 20, wherein the plurality of information storage devices comprise an N+1 array.

22. The information storage system of claim 20, wherein each stripe comprises N information strips and one parity strip, each information strip storing an integer number of logical tracks.

* * * * *

UNITED STATES PATENT AND TRADEMARK OFFICE
CERTIFICATE OF CORRECTION

| | | |
|---|---|---|
| PATENT NO. | : 6,941,420 B2 | Page 1 of 1 |
| APPLICATION NO. | : 10/080488 | |
| DATED | : September 6, 2005 | |
| INVENTOR(S) | : Henry Esmond Butterworth et al. | |

It is certified that error appears in the above-identified patent and that said Letters Patent is hereby corrected as shown below:

<u>Column 9</u>
    Line 10,"The LISA controller" should read --the LSA controller --

Signed and Sealed this

Twenty-first Day of November, 2006

JON W. DUDAS
*Director of the United States Patent and Trademark Office*